April 24, 1962     W. J. HIPP     3,030,929
FOUR WAY VALVE WITH PILOT OPERATED CHECK VALVE
Filed June 16, 1960
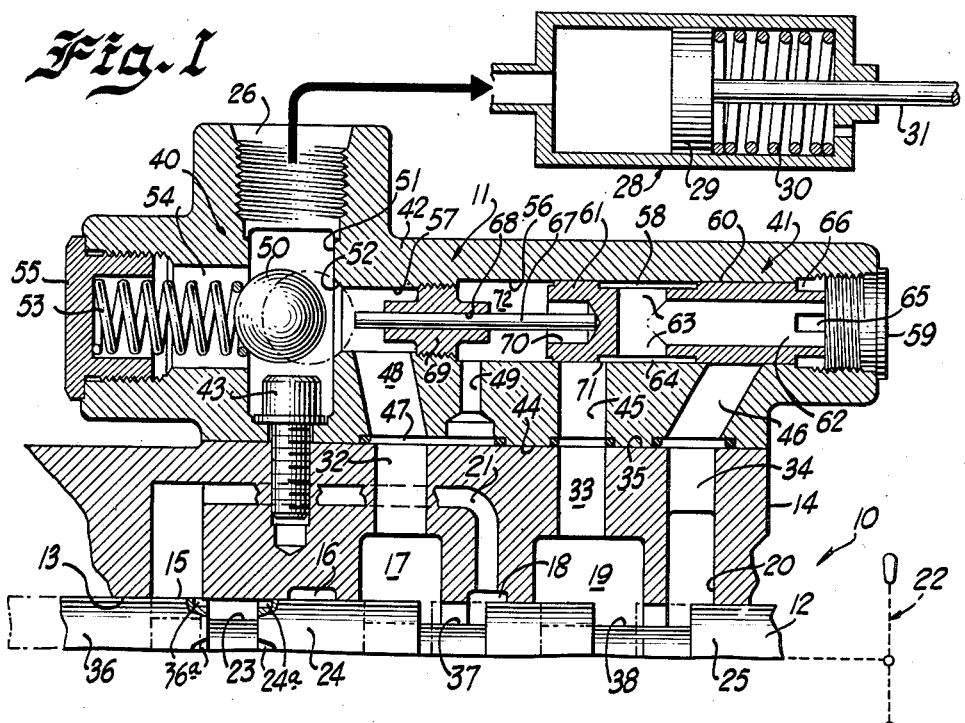
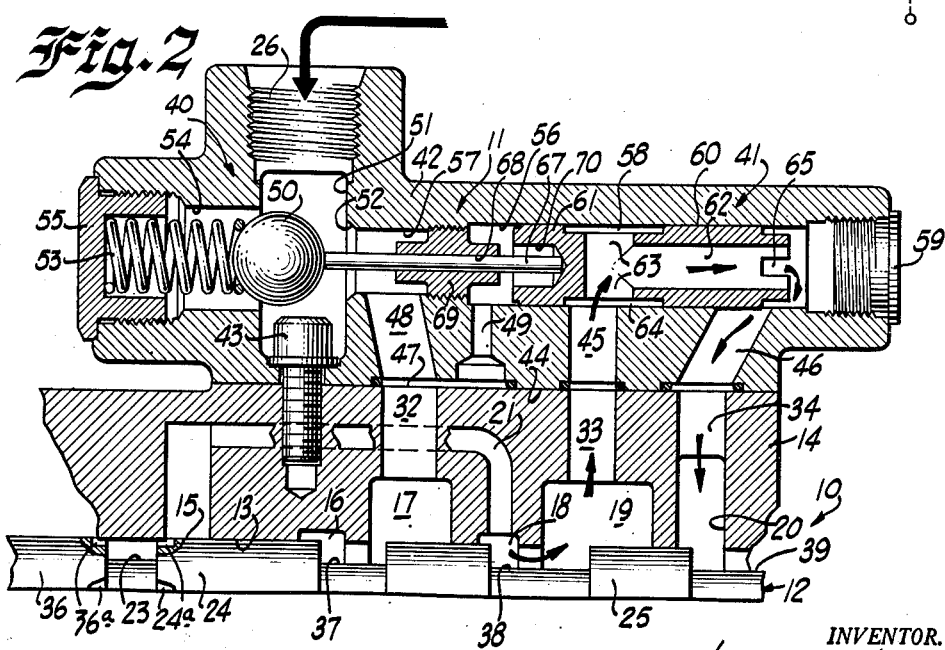
INVENTOR.
WILLIAM J. HIPP
BY
Mason, Kolehmainen, Rathburn and Wyss
ATTORNEYS.

United States Patent Office
3,030,929
Patented Apr. 24, 1962

3,030,929
FOUR WAY VALVE WITH PILOT OPERATED
CHECK VALVE
William J. Hipp, Mount Pleasant Township, Racine
County, Wis., assignor to Webster Electric Company,
Racine, Wis., a corporation of Delaware
Filed June 16, 1960, Ser. No. 36,575
6 Claims. (Cl. 121—40)

This invention relates generally to valves commonly referred to as four way valves and is particularly concerned with valves of this type employing a new and improved pilot operated check valve for passing fluid to and from a motor whose operation is controlled by the four way valve.

Four way valves are often used on large mobile equipment such as tractors, lift trucks, graders and the like where it is usually desirable to control simultaneously the fluid flow to several hydraulic cylinders or motors. To this end, several such valves are often assembled in a stack with each valve being manually operated to control one of the motors. A complete installation includes a source of fluid pressure consisting of one or more pumps driven from the vehicle engine, a tank or fluid reservoir, the hydraulic cylinders or motors and the stack of valves which usually includes a relief valve for bypassing excess fluid to the sump. Each valve in the stack includes a manually operated valve element movable in either direction from a neutral position to first and second operating positions. The arrangement is generally such that when all of the valve elements are in neutral position fluid from the source is passed directly to the tank. The motors controlled by such valves may be either of the single acting or double acting type but in either case the valve is adapted to control the fluid flow to at least one motor port in such manner that when the valve element is in its first operating position fluid under pressure is delivered from the source to the motor port while movement of the valve element to its second operating position connects the motor port to the tank.

The four way valve, whether employed in a stack or used separately, is often provided with check or lock valves for preventing the return flow from the motor through the manually operated valve except when the valve element is in its second operating position. Such an arrangement is particularly desirable when the motor is used to actuate large masses where the load is capable of developing very high back pressures. In such cases the high pressure fluid must be isolated from the control valve because the latter valve generally cannot be made leakage tight to such high pressures. Four way valves employing check valves of this type have been used before and are shown, for example, in United States Patents Nos. 1,955,154; 2,593,039 and 2,868,174. However, in all of the prior arrangements including those disclosed in the latter three patents, the lock valve is held open during the reverse flow from the motor only by supplying from the pump fluid having a very high pressure which approximates the pressure required to open the relief valve in the system. This means that the pump operates under heavy load during the reverse flow period and, hence, considerable power is being wasted. Moreover, the high pump pressure in the system during the reverse flow increases the leakage problems in the control valve. It would, of course, be desirable to provide a lock or check valve which is held open during the reverse flow period by a relatively low pressure and, as a result, the satisfaction of this desire constitutes one of the primary objects of the present invention.

Another object of the invention is to provide a new and improved check valve arrangement for use with four way valves of the type described above and effective to conserve power and to provide for relatively low pressure pump operation during the period of reverse flow from the motor controlled by the four way valve.

The foregoing and other objects are realized, in accordance with the present invention, by providing a new and improved pilot operated check valve for use with a conventional normally operated four way valve to control the fluid flow to and from an outlet port leading to a hydraulic cylinder or motor. The check valve includes a ball biased against a valve seat by means of a very light spring. When the four way valve is in one operating position, fluid under pressure from the pump unseats the ball to open the circuit to the motor in conventional manner. When the four way valve is in its other operating position it is desirable to open the check valve to permit fluid flow from the motor to the tank through the four way valve. To this end, a pilot valve is provided which moves in response to the pressure from the pump. The pilot valve movement actuates a member acting against one side of the ball so that the latter is unseated when the pump pressure becomes sufficient to overcome the pressure of the biasing spring plus the pressure of the motor return fluid acting against the other side of the ball. As soon as the ball is unseated it is hydraulically balanced and, hence, at this time the pilot valve is required to act only against the very light pressure of the spring. The pump pressure required to maintain the pilot valve in a position wherein the ball is unseated is automatically reduced to a very low value, thus conserving the power required to drive the pump during the period of reverse flow through the check valve.

The invention, both as to its organization and manner of operation, together with further objects and advantages will best be understood by reference to the following description taken in conjunction with the accompanying drawing wherein:

FIG. 1 is a sectional view illustrating a valve characterized by the features of the present invention with all of the valve passages being shown as if they lie in a common plane although in actual practice it will be necessary to offset some of these passages within the valve body in order to isolate them; and FIG. 2 is a view similar to FIG. 1 but illustrating the valve in a different operating position.

Referring now to the drawing and first to FIG. 1 the present invention is there shown as comprising a four-way control valve indicated generally by the reference numeral 10 together with a pilot operated check valve 11. The four way valve may be of any conventional construction and, as was indicated above, may be used either separately or may be assembled in a stack of similar valves having an inlet connection or block (not shown) preferably at one end of the stack and an outlet connection or block (also not shown) at the other end of the stack. The inlet connection to the four way valve or to the stack receives fluid from a source such as the outlet of a pump or group of pumps having their inlets connected to a tank or reservoir (not shown). The outlet connection from the four way valve or the stack is also connected to the tank or reservoir. While the valve 10 may take any of the forms well known in this art it is illustrated as comprising a valve plunger or spool 12 mounted for sliding movement within a bore 13 defined in a valve casing or body 14. If the valve 10 is assembled with other similar valves, the bodies for the other valves in the stack are assembled side by side and in flush face to face engagement with the body 14 shown in FIG. 1. The valve spool 12 is reciprocated within the bore 13 by operating a manual control indicated schematically in the drawing and identified by the reference numeral 22. The valve body is provided with a plurality of passages connected to ports opening to the bore with these ports comprising from left to right as viewed in FIG. 1 an open center or through port 15, a first exhaust port 16, a first motor port 17, an inlet port 18, a second motor port 19 and a second exhaust port 20. The inlet port 18 and the open center port 15 are connected together through a passage 21 defined in the valve body and this passage is in turn connected to the inlet connection for the valve or the stack.

When using a stacked valve assembly with all of the valve spools in their neutral positions indicated by the broken line in FIG. 1, the open center ports 15 are connected directly together via annular grooves 23 formed in the valve spools. The last valve in the stack has the outlet side of the open center passage connected to the tank or reservoir and, hence, with all of the valves in neutral position a direct connection is provided through the open center ports and passages between the pump outlet and the tank, thereby unloading the pump and conserving power. This open center bypass connection is, of course, conventional and forms no part of the present invention.

The two exhaust ports 16 and 20 are connected through passages in the valve body to the outlet connection from the valve or the stack and, hence, are connected directly to the tank or reservoir. When the valve spool is in neutral position both of these exhaust ports are blocked, the port 16 being covered by a land 24 on the valve spool and the port 20 being covered by a land 25.

The motor port 17 is connected through a passage 32 and through the pilot operated check valve 11 to a motor connection 26 which is, in turn, connected through a pipe or conduit to one side of a fluid operated cylinder or motor 28. The latter motor is illustrated as being of the single acting type and, to this end, includes a piston 29 biased toward one end of the cylinder either by gravity, by a spring 30 or by a combination of these two. The piston 29 has its connecting rod 31 secured to the work implement to be controlled by the motor 28. The motor port 19 and the exhaust port 20 are connected to the pilot operated check valve 11 through passages 33 and 34, respectively, which open to one face 35 of the valve body.

When it is desired to admit fluid to the motor 28 to move the piston 29 to the right as viewed in FIG. 1, the valve plunger 12 is moved to the right from its neutral position towards the position shown in solid lines in FIG. 1 whereupon the open center port 15 is blocked by a land 36 at one end of the spool while the exhaust port 16 is still blocked by the land 24. However, with the spool 12 in this position, the inlet port 18 is connected to the first motor port 17 through an annular groove 37 in the valve spool while, at the same time, the motor port 19 is connected to the exhaust port 20 through an annular groove 38. To enable the pressure of the fluid supplied to the motor port 17 to be increased gradually in response to piston movement, the land 36 is provided with a plurality of spaced apart metering grooves 36a. These grooves are preferably tapered so that, when the valve plunger 12 is moved to the right, they gradually interrupt the fluid flow through the open center passage in order to cause the pressure at the inlet port to increase as a function of the plunger movement.

When it is desired to cut off the fluid supply to the motor 28 to permit the piston 29 to return to the left under the influence of its biasing means the valve spool 12 is moved to the left from its neutral position, that is, it is moved to the position shown in FIG. 2, whereupon the open center port 15 is blocked by the land 24 and the exhaust port 20 is connected to the tank through the annular groove 39 in the valve spool. At this time, the inlet port 18 is connected to the motor port 19 through the annular groove 38 in the valve spool while the motor port 17 is connected to the exhaust port through the annular groove 37. Here again, the land 24 is provided with a plurality of spaced apart, tapered, metering grooves 24a to control the rate of flow of return fluid in a manner described more fully below.

The pilot operated check valve 11 of the present invention actually comprises a check valve indicated generally by the reference numeral 40 and a pilot valve 41. Both of these valves are preferably mounted within a common valve body 42 suitably connected to the valve body 14 for the four way valve. For example, the pilot operated check valve may be connected to the valve body 14 through pipes or conduits but in the form illustrated the fluid connections are provided by securing the valve body 42 to the body 14 in any suitable manner such as by means of screws 43. In the form shown, the valve body 42 is provided with a flat machined face 44 lying against the flat face 35 of the valve body 14 and cooperating therewith to provide a tight seal between the engaging portions of the faces. Passages 45 and 46 formed in the valve body 42 are respectively connected to the passages 33 and 34 and lead to the pilot valve 41. A recess 47 in the valve body 42 communicates with the passage 32 and is connected to passages 48 and 49. O rings are provided in the recess 47 and adjacent the passages 45 and 46 to provide a fluid seal for preventing escape of fluid between the faces 35 and 44. The check valve 40 may be of any conventional construction but, as shown, it comprises a ball 50 within a valve chamber 51 in the body 42 and biased towards a tapered valve seat 52 by means of a coil spring 53. The latter spring extends through a spring chamber 54 and has its opposed ends respectively seated against the ball 52 and a plug 55 threaded into the end of the spring chamber. The valve seat 52 is formed at one end of an elongated bore 56 extending through the valve body 42. The latter bore includes a reduced diameter portion 57 adjacent the valve seat and an enlarged diameter portion 58 having an internally threaded end portion for accommodating a closure plug 59. The reduced diameter portion 57 communicates with the motor port 17 of the four way valve through the aligned passages 32 and 48. The valve chamber 51 opens to the motor connection 26 to provide for fluid flow between the check valve 40 and the motor 28 whenever the ball 50 is unseated. Thus, when the valve spool 12 is in the operating position shown in solid lines in FIG. 1, fluid under pressure from the source is delivered to the check valve from the inlet port 18, through the groove 37, through the motor port 17 and through the passages 32 and 48. As soon as this pressure becomes sufficient to overcome the biasing spring 53, the ball 52 is unseated thus supplying fluid under pressure from the source to the motor 28 through the motor connection 26. This fluid, of course, moves the piston 29 to the right as viewed in FIG. 1 against its biasing means. When the pressure of the fluid becomes insufficient to maintain the check valve open the fluid flow to the motor 28 terminates automatically. The operation thus far described is similar to that of prior four way valves employing a check valve leading to their motor port.

In accordance with the present invention, the pilot valve 41 controls the check valve 40 to permit the reverse flow of fluid from the motor 28 to the four way valve 10 when the valve spool is moved to the position illustrated in FIG. 2. To this end, the pilot valve includes a piston 60 mounted for sliding movement within the enlarged diameter portion 58 of the bore 56. The piston 60 is in the form of a hollow cylinder having a head 61 at one end and also having an elongated inner chamber 62 opening to the opposite end. A plurality of openings 63 in the piston wall lead from the inner chamber 62 to an annular peripheral groove 64 defined in the exterior of the piston wall. The open end of the piston 60 is provided with a plurality of spaced apart axially extending slots or openings 65 leading from the inner chamber 62 to an end chamber 66 formed between the piston 60, the bore portion 58 and the plug 59. A rod 67 extends between the piston 60 and the check valve 40 to unseat the ball during the reverse flow period. This rod is supported for sliding movement within a central axial opening 68 extending through a cylindrical plug 69 which is mounted in fixed position within the reduced diameter portion 57. The plug 69 may be mounted in any convenient manner but as shown is threaded into an internally threaded section of the bore portion 57. The plug 69 is spaced from the head 61 of the piston thus forming a leakage chamber 72 which is connected to the passage 49. One end of the rod 67 is seated within a recess 70 in the head 61 of the piston and the rod is of such length that, with the piston 60 at the extreme right of the bore 56 and with the ball 50 of the check valve seated, the left end of the rod 67 as viewed in FIG. 1 is located immediately adjacent the ball. The piston 60 is so constructed and arranged that, when the piston is at the extreme right of the bore 56 with its open end engaging the plug 59, the passage 45 is connected to the recess 64. The side wall bounding the recess 64 on the left as viewed in FIG. 1 cooperates with the passage 45 to form a variable regulating port 71 the size of which is varied by movement of the piston 60.

Considering now the operation of the pilot valve 41 with the valve spool 12 in the position shown in FIG. 2, it should be observed that when the spool is first moved to this position the ball 50 of the check valve is seated against the valve seat 52 by the combined action of the spring 53 and the hydraulic pressure of the fluid from the motor 28 acting against the left side of the ball 50. At this time, the motor port 17 is connected to the tank and, hence, the pressure of the fluid on the right side of the ball 50 is very low. Fluid under pressure from the source flows from the inlet port 18, through the groove 38, through the motor port 19 through the aligned passages 33 and 45 and through the variable regulating port 71 to the inner chamber 62 within the pilot valve piston 60. The pressure of the fluid supplied through the passage 33 may be gradually increased by moving the plunger 12 to the left in order to restrict the fluid flow through the metering grooves 24a. When the metering grooves are substantially uncovered the pressure of the fluid at the inlet port 18 is very low but this pressure builds up as the flow through the grooves is restricted or blocked completely. Thus, the fluid pressure supplied through the passage 33 may be controlled simply by moving the plunger 12 within a very small range about the operating position shown in FIG. 2. The left face of the piston head 61 is exposed to the low pressure fluid in the chamber 72 since this chamber is connected to the tank through the passage 49, the recess 47, the passage 32, the motor port 17, the groove 37 and the exhaust port 16. The pressure of the fluid in the chamber 62 acts against the right face of the piston head to develop a net force urging the piston 60 towards the left. Leftward movement of the piston is inhibited by the rod 67 seating against the ball 50, and hence, the piston cannot move until the pressure of the fluid in the chamber 62 becomes sufficient to overcome both the spring 53 and the force of the motor return fluid acting against the left side of the ball. Fluid cannot be returned from the motor 28 until the check valve is opened. When the piston 60 moves to the left the rod 67 pushes the ball 50 away from the valve seat 52 whereupon the motor return fluid flows to the tank through the check valve 40, through the aligned passages 32 and 48, through the motor port 17, through the groove 37 and through the exhaust port 16. The ball 50 becomes hydraulically balanced since the fluid forces acting on all sides are substantially equal. Thus, the only force urging the ball 50 to the right towards its seat 52 is that supplied by the relatively light spring 53. As a consequence, the piston 60 is immediately moved towards the left to the position shown in FIG. 2 where it holds the check valve open. The regulating port 71 becomes very large since the entire end of the passage 45 is exposed to the groove 64. The pilot valve may now hold the ball open by supplying from the pump a very low pressure of sufficient value to overcome the spring 53. Specifically, the pressure of the fluid delivered from the pump to the passage 45 may be very low. This pressure is dropped by the pressure regulating action of the slots 65 and the passage 34. These slots and the adjacent portions of the valve bore form small, variable orifices for passing fluid around the open end of the piston 60 to the tank through the passages 34 and 46, through the port 30 and through the groove 39. The pressure drop across these orifices is just sufficient to maintain the piston 60 in its leftward position shown in FIG. 2 during the period of reverse flow from the motor 28. Since the pump pressure may be very low during this period, the described arrangement results in conservation of the power required for pump operation.

The pressure of the fluid acting against the piston 60, as was indicated above, may be controlled by moving the plunger 12 to cover or uncover the metering grooves 24a. Thus, the latter grooves cooperate with the orifices 65 to control the rate of return of fluid from the motor 28 to the tank, thereby permitting full control of the speed of descent of the piston 29 through manual operation of the plunger 12. More specifically, when the plunger 12 is positioned to permit a small flow of fluid through the metering grooves 24a and through the orifices 65, the piston 60 moves slightly to the right from the position it occupies when the grooves 24a are completely blocked. The latter rightward movement of the piston 60 permits the ball 50 to move towards the seat 52, thereby restricting somewhat the path for return fluid from the motor 28 and, hence, controlling the speed of movement of the piston 29.

The piston 60 is maintained at the right end of the bore 56 when the valve is in either the neutral position or the motor forward position shown in solid lines in FIG. 1. Thus, when the valve is in neutral position the piston 60 is hydraulically balanced and the spring 53 becomes effective to seat the ball 50 and, hence, to move both the rod 67 and the piston 60 to the right. When the valve spool 12 is in the position shown in solid lines in FIG. 1 the pressure of the fluid flowing through the check valve 40 to the motor 28 is also supplied through the recess 47 and the passage 49 to the chamber 72 thus providing a fluid pressure acting against the left face of the piston head 61 to force the piston to the right.

While particular embodiments of the invention have been illustrated and described, it will be understood by those skilled in this art that many modifications and changes may be made without departing from the true spirit and scope of the invention as set forth in the appended claims.

What is claimed as new and desired to be secured by Letters Patent of the United States is:

1. In combination a four way valve of the type having an inlet receiving fluid from a source, a return to said source, a pair of outlets one of which is connected to a fluid motor, and a check valve, said four way valve including a valve element movable from a first position wherein it connects said inlet to deliver fluid at relatively high pressure from said source to said one motor outlet through said check valve and to a second position wherein it connects said one motor outlet to said return through said check valve and connects the other valve outlet to said inlet, and a pilot valve operated by the fluid delivered to said other valve outlet when said valve element is in said second position for opening said check valve to permit flow from said motor outlet to said return, said pilot valve including means for maintaining said check valve open in response to pressure from said source considerably lower than said relatively high pressure.

2. In combination a four way valve of the type having an inlet receiving fluid from a source, a return to said source, a pair of outlets one of which is connected to a fluid motor, and a check valve, said four way valve including a valve element movable from a first position wherein it connects said inlet to said one motor outlet through said check valve and to a second position wherein it connects said one motor outlet to said return through said check valve and connects the other valve outlet to said inlet, and a pilot valve responsive to the fluid delivered to said other valve outlet only when said valve element is in said second position for opening said check valve to permit flow from said motor outlet to said return, said pilot valve including means defining a valve bore, means including a piston mounted in said bore for opening said valve in response to movement of the piston within the bore from a non-actuating position to a check valve actuating position, means connecting said bore to said other valve outlet in order to deliver fluid under pressure acting against said piston when said valve element is in its second position, said piston including means cooperating with said bore when said piston is in ts actuating position to define a variable orifice for delivering fluid from the connecting means to the return, thereby to maintain said piston in its actuating position in response to the relatively low pressure drop across said orifice.

3. In combination a four way valve of the type having an inlet receiving fluid from a source, a return to said source, a pair of outlets one of which is connected to a fluid motor, and a check valve, said four way valve including a valve element movable from a first position wherein it connects said inlet to deliver fluid at relatively high pressure from said source to said one motor outlet through said check valve and to a second position wherein it connects said one motor outlet to said return through said check valve and connects the other valve outlet to said inlet, and a pilot valve operated by the fluid delivered to said other valve outlet when said valve element is in said second position for opening said check valve to permit flow from said motor outlet to said return, said pilot valve including means defining a valve bore, means including a piston mounted in said bore for opening said check valve in response to movement of the piston within the bore from a non-actuating position to an actuating position, means connecting the bore to said other valve outlet, said piston including means defining a chamber therein for receiving fluid from said connecting means in order to apply a fluid force against said piston to move it to its actuating position when the valve element is in its second position, said piston including means cooperating with said bore when said piston is in its actuating position to define a pressure regulating orifice for passing fluid from said chamber to said return, thereby to maintain the piston in its actuating position in response to the relatively small pressure drop across said orifice.

4. The valve defined by claim 1 wherein said four way valve includes means for varying the pressure of the fluid delivered to said pilot valve in accordance with the position of said valve element, thereby to permit said valve element to control the speed of operation of said motor when said valve element is in its second position.

5. The valve defined by claim 2 wherein said four way valve includes means for varying the pressure of the fluid delivered to said pilot valve in accordance with the position of said valve element, thereby to permit said valve element to control the speed of operation of said motor when said valve element is in its second position.

6. The valve defined by claim 3 wherein said four way valve includes means for varying the pressure of the fluid delivered to said pilot valve in accordance with the position of said valve element, thereby to permit said valve element to control the speed of operation of said motor when said valve element is in its second position.

References Cited in the file of this patent
UNITED STATES PATENTS

| | | |
|---|---|---|
| 1,955,154 | Temple | Apr. 17, 1934 |
| 2,304,380 | Shaeffer | Dec. 8, 1942 |
| 2,362,339 | Armington | Nov. 7, 1944 |
| 2,593,039 | Livers et al. | Apr. 15, 1952 |
| 2,648,346 | Deardorff et al. | Aug. 11, 1953 |
| 2,868,174 | Shutt | Jan. 13, 1959 |